(12) United States Patent
Ou et al.

(10) Patent No.: US 10,805,905 B2
(45) Date of Patent: Oct. 13, 2020

(54) TERMINAL STATION DEVICE AND BANDWIDTH ALLOCATION METHOD

(71) Applicant: NIPPON TELEGRAPH AND TELEPHONE CORPORATION, Tokyo (JP)

(72) Inventors: Hiroshi Ou, Yokosuka (JP); Tatsuya Shimada, Yokosuka (JP); Takayuki Kobayashi, Yokosuka (JP); Jun Terada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/562,114

(22) PCT Filed: Mar. 28, 2016

(86) PCT No.: PCT/JP2016/059878
§ 371 (c)(1),
(2) Date: Sep. 27, 2017

(87) PCT Pub. No.: WO2016/158846
PCT Pub. Date: Oct. 6, 2016

(65) Prior Publication Data
US 2018/0077686 A1    Mar. 15, 2018

(30) Foreign Application Priority Data

Mar. 30, 2015    (JP) ................................ 2015-068882

(51) Int. Cl.
*H04W 72/04* (2009.01)
*H04L 12/44* (2006.01)

(52) U.S. Cl.
CPC ............. *H04W 72/04* (2013.01); *H04L 12/44* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,164,861 B2 * | 1/2007 | Takachio | ............. | H04B 10/271 398/48 |
| 8,718,087 B1 * | 5/2014 | Johnston | ................. | H04L 12/12 370/463 |

(Continued)

FOREIGN PATENT DOCUMENTS

| | | |
|---|---|---|
| CN | 101159495 A | 4/2008 |
| CN | 101383767 A | 3/2009 |

(Continued)

OTHER PUBLICATIONS

Tashiro Takayoshi et al: "A novel DBA scheme for TDM-PON based mobile fronthaul", OFC 2014, OSA, Mar. 9, 2014 (Mar. 9, 2014), pp. 1-3.

(Continued)

*Primary Examiner* — Yee F Lam
(74) *Attorney, Agent, or Firm* — Harness, Dickey & Pierce, P.L.C.

(57) ABSTRACT

Information on allocation of a bandwidth of uplink communication of each of user devices is extracted from information notified from an upper-level device on the uplink communication of the user devices. Correspondence information is created to indicate a correspondence among the upper-level device, the terminal device, the lower-level device, and the user device. A start time point of the uplink communication of the terminal device and an information amount of signals for which transmission of the uplink communication of the terminal device is allowed are allocated to the terminal device on the basis of the information on allocation of the bandwidth of the uplink communication (Continued)

of each of the user devices and the correspondence information.

7 Claims, 8 Drawing Sheets

(56) References Cited

U.S. PATENT DOCUMENTS

| | | | | |
|---|---|---|---|---|
| 9,178,713 | B1* | 11/2015 | Johnston | H04Q 11/0067 |
| 9,560,668 | B1* | 1/2017 | Sevindik | H04W 72/1231 |
| 10,505,657 | B2* | 12/2019 | Ou | H04J 14/0228 |
| 2007/0237177 | A1* | 10/2007 | Endo | H04Q 11/0071 |
| | | | | 370/468 |
| 2008/0138072 | A1* | 6/2008 | Sakamoto | H04J 14/0226 |
| | | | | 398/68 |
| 2008/0279549 | A1* | 11/2008 | Kazawa | H04B 10/0773 |
| | | | | 398/17 |
| 2009/0162064 | A1* | 6/2009 | Mizutani | H04J 14/0246 |
| | | | | 398/66 |
| 2009/0245790 | A1* | 10/2009 | Mizutani | H04J 14/0282 |
| | | | | 398/43 |
| 2010/0129072 | A1* | 5/2010 | Yoshiuchi | H04B 10/6911 |
| | | | | 398/17 |
| 2010/0272436 | A1* | 10/2010 | Mizutani | H04J 3/1694 |
| | | | | 398/25 |
| 2011/0305458 | A1* | 12/2011 | Zhou | H04Q 11/0067 |
| | | | | 398/66 |
| 2012/0045213 | A1* | 2/2012 | Miura | H04Q 11/0067 |
| | | | | 398/98 |
| 2012/0063774 | A1 | 3/2012 | Niibe et al. | |
| 2012/0066729 | A1* | 3/2012 | Zou | H04N 21/6125 |
| | | | | 725/93 |
| 2012/0093509 | A1* | 4/2012 | Kazawa | H04J 14/0247 |
| | | | | 398/58 |
| 2012/0106958 | A1* | 5/2012 | Sakamoto | H04J 14/0252 |
| | | | | 398/58 |
| 2012/0128349 | A1* | 5/2012 | Mitsunaga | H04J 14/0268 |
| | | | | 398/25 |
| 2013/0004172 | A1* | 1/2013 | Sugawa | H04J 14/025 |
| | | | | 398/72 |
| 2013/0236170 | A1* | 9/2013 | Nishitani | H04L 12/2861 |
| | | | | 398/25 |
| 2013/0343755 | A1* | 12/2013 | Cvijetic | H04Q 11/0066 |
| | | | | 398/45 |
| 2014/0112656 | A1* | 4/2014 | Yamashita | H04L 12/44 |
| | | | | 398/16 |
| 2014/0161456 | A1* | 6/2014 | Sugawa | H04J 14/0246 |
| | | | | 398/72 |
| 2014/0193150 | A1* | 7/2014 | Mukai | H04J 14/0252 |
| | | | | 398/67 |
| 2015/0208347 | A1* | 7/2015 | Iiyama | H04W 8/24 |
| | | | | 370/311 |
| 2015/0229397 | A1* | 8/2015 | Shibata | H04B 10/25753 |
| | | | | 398/115 |
| 2015/0311980 | A1 | 10/2015 | Kuwano et al. | |
| 2015/0373640 | A1* | 12/2015 | Iiyama | H04W 72/1289 |
| | | | | 398/45 |
| 2016/0277142 | A1* | 9/2016 | Doo | H04B 10/27 |
| 2017/0054719 | A1* | 2/2017 | Zheng | H04B 10/25 |
| 2017/0288777 | A1* | 10/2017 | Mahloo | H04B 10/25753 |
| 2018/0063831 | A1* | 3/2018 | Ou | H04L 47/824 |

FOREIGN PATENT DOCUMENTS

| | | |
|---|---|---|
| CN | 102474439 A | 5/2012 |
| JP | 2011-119850 A | 6/2011 |
| JP | 2014-160949 A | 9/2014 |
| WO | WO-2014/061552 A1 | 4/2014 |
| WO | WO-2014-077168 A1 | 5/2014 |
| WO | WO-2014/103804 A1 | 7/2014 |

OTHER PUBLICATIONS

Extended European Search Report for parallel application EP 16772727.0, EPO, Munich, dated Jul. 13, 2018.
"IEEE Std. 802.3-2012", IEEE, 2012.
Go Yazawa, "Low-latency transmission technique for mobile fronthaul based on TDM-PON system", Proceedings of the 2013 IEICE Communications Society Conference 2, Sep. 3, 2013 (Sep. 3, 2013), p. 181.
International Search Report for PCT/JP2106/059878, ISA/JP, dated Jun. 14, 2016, with English translation thereof.
Chinese Office Action regarding CNSN 201680019505X, dated Oct. 8, 2019.
Chinese Notice of Allowance from counterpart CN201680019505X dated Mar. 18, 2020.

* cited by examiner

| UPPER-LEVEL DEVICE IDENTIFIER | TERMINAL DEVICE IDENTIFIER | LOWER-LEVEL DEVICE IDENTIFIER |
|---|---|---|
| 10 | 13-1 | 14-1 |
| ⋮ | ⋮ | ⋮ |
| 10 | 13-i | 14-i |
| ⋮ | ⋮ | ⋮ |
| 10 | 13-P | 14-P |

| TERMINAL DEVICE IDENTIFIER | USER DEVICE IDENTIFIER |
|---|---|
| 13-1 | 15-1 |
| ⋮ | ⋮ |
| 13-1 | 15-u |
| ⋮ | ⋮ |
| 13-P | 15-U |

TERMINAL STATION DEVICE AND BANDWIDTH ALLOCATION METHOD

CROSS REFERENCE TO RELATED APPLICATIONS

This application is a U.S. National Phase Application under 35 U.S.C. 371 of International Application No. PCT/JP2016/059878 filed on Mar. 28, 2016 and published in Japanese as WO 2016/158846 on Oct. 6, 2016. This application is based on and claims the benefit of priority from Japanese Patent Application No. 2015-068882 filed on Mar. 30, 2015. The entire disclosures of all of the above applications are incorporated herein by reference.

TECHNICAL FIELD

The present invention relates to a terminal station device and a bandwidth allocation method.
Priority is claimed on Japanese Patent Application No. 2015-068882, filed Mar. 30, 2015, the content of which is incorporated herein by reference.

BACKGROUND ART

In a mobile radio communication service such as Long Term Evolution (LTE), LTE-Advanced, and the like (hereinafter collectively referred to as "LTE and the like"), a radio base station device may sometimes include a base band unit (BBU) and a remote radio head (RRH).

A base band unit of a radio base station device may sometimes include an upper-level device and a terminal station device. The upper-level device and the terminal station device may sometimes be integrated in a base station and execute a baseband process.

On the other hand, a remote radio head of a radio base station device is not integrated in a base station and executes a radio process outside the base station. Moreover, the remote radio head is positioned in a lower-level device in relation to an upper-level device and a terminal station device.

Moreover, in a general configuration, a terminal device is connected to a terminal station device in one-to-one correspondence.

In contrast, in Patent Document 1, a remote radio head which is a lower-level device is connected to a terminal station device via a terminal device of a communication system in which a terminal station device is connected to a plurality of terminal devices in one-to-multiple correspondence (see Patent Document 1).

Moreover, LTE and the like use finite frequency resources efficiently by arranging a large number of small cells in an area to achieve a faster data rate and a larger communication capacity. LTE and the like discuss methods of accommodating an upper-level device, a terminal station device, a terminal device, and a lower-level device using a communication system in which a terminal station device and a plurality of terminal devices are connected in one-to-multiple correspondence. A passive optical network (PON) system is an example of a communication system in which a terminal station device and a plurality of terminal devices are connected in one-to-multiple correspondence (see Non-Patent Document 1).

In a mobile radio communication service, strict requirements are set for the latency between an upper-level device and a lower-level device for execution of re-transmission control (a hybrid automatic repeat request (HARQ)). Therefore, in Patent Document 1, uplink communication scheduling information of a user device (user equipment (UE)) connected to a lower-level device is transmitted from an upper-level device to a terminal station device, a terminal device, and the lower-level device sequentially and the user device is notified thereof. Moreover, a start time and a signal information amount of uplink communication from the terminal device to the terminal station device are calculated on the basis of the uplink communication scheduling information. In this way, signals of uplink communication from the lower-level device to the upper-level device according to Patent Document 1 are transmitted with low latency.

CITATION LIST

Patent Literature

[Patent Document 1]
 International Patent Publication WO2014/077168
[Non-Patent Literature]
[Non-Patent Document 1]
 "IEEE Std. 802.3-2012", IEEE, 2012

SUMMARY OF INVENTION

Technical Problem

However, in a mobile radio communication service, a lower-level device and user devices may sometimes be connected in one-to-multiple correspondence. The terminal station device according to Patent Document 1 needs to calculate the transmission start time point of the uplink communication of the terminal device and the information amount of signals for which transmission of the uplink communication of the terminal device is allowed on the basis of the scheduling information of the uplink communication of the plurality of user devices. In this case, the terminal station device needs to understand the connection relation of respective devices of the communication system, for example, a terminal device via which the plurality of user devices are connected to the terminal station device.

However, the conventional terminal station device does not understand the connection relation of respective devices of the communication system. Due to this, in the conventional terminal station device, there is a problem that it is difficult to improve the utilization efficiency of a frequency band of the communication system in which the lower-level device and the user devices are connected in one-to-multiple correspondence.

With the foregoing in view, an object of the present invention is to provide a terminal station device and a bandwidth allocation method capable of improving the utilization efficiency of a frequency band of a communication system in which a lower-level device and user devices are connected in one-to-multiple correspondence.

Solution to Problem

An aspect of the present invention provides a terminal station device in which a terminal device connected to a lower-level device accommodating a plurality of user devices is connected on a lower level side and an upper-level device is connected on an upper-level side, the terminal station device including: an information extraction unit that extracts information on allocation of a bandwidth of uplink communication of each of the plurality of user devices from information notified by the upper-level device on the uplink communication of the plurality of user devices; a processing unit that creates correspondence information indicating a correspondence among the upper-level device, the terminal device, the lower-level device, and the plurality of user devices; and a bandwidth allocation unit that allocates a start time point of the uplink communication of the terminal device and an information amount of signals for which transmission of the uplink communication of the terminal device is allowed to the terminal device on a basis of the information on allocation of the bandwidth of the uplink communication of each of the plurality user devices and the correspondence information.

As a typical example, the terminal station device further includes a communication unit that receives identification information of the lower-level device connected to a lower level side of the terminal device from the terminal device, wherein the information extraction unit further extracts information indicating correspondence between the upper-level device and the lower-level device from the information notified by the upper-level device on the uplink communication of the plurality of user devices, and the processing unit creates the correspondence information on a basis of the extracted information on the correspondence between the upper-level device and the lower-level device.

As a preferred example, the processing unit obtains information indicating a correspondence among the upper-level device, the lower-level device, and the plurality of user devices from the upper-level device and obtains information indicating a correspondence between the terminal device and the lower-level device from the terminal device to create the correspondence information.

Another aspect of the present invention provides a bandwidth allocation method in a terminal station device in which a terminal device connected to a lower-level device accommodating a plurality of user devices is connected on a lower level side and an upper-level device is connected on an upper-level side, the bandwidth allocation method including: extracting information on allocation of a bandwidth of uplink communication of each of the plurality of user devices from information notified by the upper-level device on the uplink communication of the plurality of user devices; creating correspondence information indicating a correspondence among the upper-level device, the terminal device, the lower-level device, and the plurality of user devices; and allocating a start time point of the uplink communication of the terminal device and an information amount of signals for which transmission of the uplink communication of the terminal device is allowed to the terminal device on a basis of the information on allocation of the bandwidth of the uplink communication of each of the plurality of user devices and the correspondence information.

Advantageous Effects of Invention

According to the terminal station device and the bandwidth allocation method of the present invention, it is possible to improve the utilization efficiency of a frequency band of a communication system in which a lower-level device and user devices are connected in one-to-multiple correspondence.

DESCRIPTION OF EMBODIMENTS

Embodiments of the present invention will be described in detail with reference to the drawings.

First Embodiment

Figure 1:
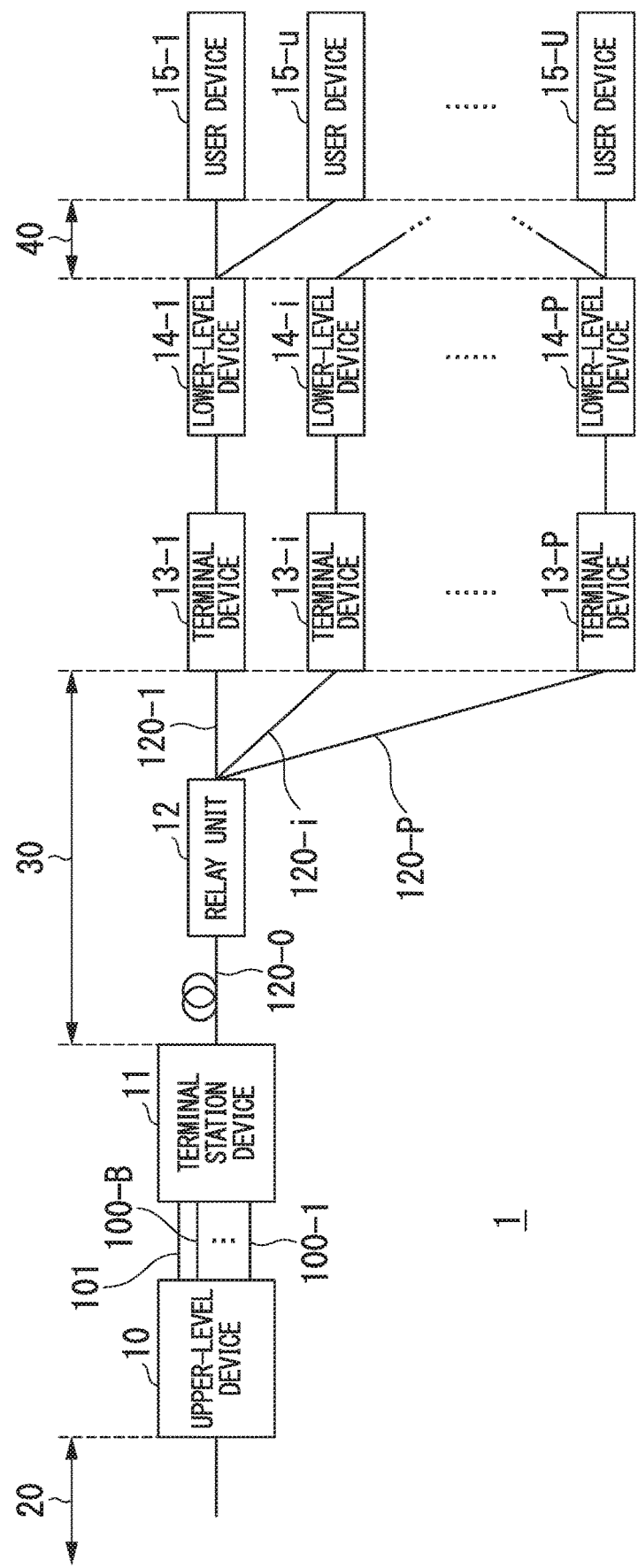
FIG. 1 is a diagram showing a configuration example of a communication system according to a first embodiment of the present invention.

FIG. 1 is a diagram showing a configuration example of a communication system 1 according to a first embodiment of the present invention.

The communication system 1 performs communication using optical signals. The communication system 1 includes an upper-level device 10, a terminal station device 11, a relay unit 12, a terminal device 13 (in the drawings, 13-1 to 13-P), a lower-level device 14 (in the drawings, 14-1 to 14-P), and a user device 15 (in the drawings, 15-1 to 15-U).

As an example, the communication system 1 includes a passive optical network (PON) that includes the terminal station device 11, the terminal device 13, an optical fiber 120 (in the drawing, 120-0 and 120-1 to 120-P), and the relay unit 12.

Hereinafter, the direction from the upper-level device 10 to the user device 15 will be referred to as "downlink." Moreover, the direction from the user device 15 to the upper-level device 10 will be referred to as "uplink."

The upper-level device 10 functions as a base band unit (BBU). The upper-level device 10 may be communicably connected to another upper-level system via an upper-level network 20.

In the communication system 1, the upper-level device 10 is a highest level device (an upper-level-side device). The upper-level device 10 and the terminal station device 11 are connected in one-to-one correspondence. The upper-level device 10 transmits main signals of downlink communication and an identifier of a destination lower-level device 14 to the terminal station device 11 via B main signal lines 100 (B is an integer of 1 or more and equal to or smaller than the number P of terminal devices 13).

The main signals of downlink communication may include scheduling information (information on bandwidth allocation or the like) of uplink communication of the user device 15. The upper-level device 10 receives main signals of the uplink communication from the terminal station device 11 via the B main signal lines 100. A plurality of upper-level devices 10 may be provided. In this case, the plurality of upper-level devices 10 are connected to the terminal station device directly or via a line concentration switch.

Hereinafter, the identifier of the lower-level device 14 will be referred to as a "lower-level device identifier." The identifier is a media access control (MAC) address or an Internet protocol (IP) address, for example.

The lower-level device identifier may be an identifier which is uniquely assigned to a network in an arbitrary range. Hereinafter, a communication line between the terminal station device 11 and the terminal device 13 will be referred to as a "relay network 30."

The upper-level device 10 transmits an auxiliary signal to the terminal station device 11 via an auxiliary signal line 101. This auxiliary signal includes the lower-level device identifier of the lower-level device 14 connected to the upper-level device 10 via the relay network 30.

Moreover, the auxiliary signal includes an identifier (hereinafter referred to as a "user device identifier") of the user device 15 connected to the lower-level device 14. Furthermore, the auxiliary signal may include the scheduling information (information on bandwidth allocation or the like) of the uplink communication of the user device 15.

The terminal station device 11 is an optical line terminal (OLT).

In the configuration of FIG. 1, the terminal station device 11 and the terminal devices 13-1 to 13-P (P is an integer of 2 or more) are connected in one-to-multiple correspondence via the optical fiber 120 and the relay unit 12. However, the terminal station device 11 and the terminal device 13 may be connected in one-to-one correspondence via the optical fiber 120 and the relay unit 12.

The relay unit 12 is an optical splitter. The relay unit 12 branches an optical signal received from the terminal station device 11 via the optical fiber 120-0 using the optical fibers 120-1 to 120-P and transmits the optical signals to the terminal devices 13-1 to 13-P. Moreover, the relay unit 12 transmits optical signals received from the terminal devices 13-1 to 13-P via the optical fibers 120-1 to 120-P to the terminal station device 11.

The relay unit 12 may be a multiplexing device that multiplexes or demultiplexes optical signals.

The terminal device 13 is an optical network unit (ONU). A terminal device 13-$i$ ($i$ is 1 to P) and a lower-level device 14-$i$ are connected in one-to-one correspondence.

The lower-level device 14 is a communication device, and is a remote radio head for example. The lower-level device 14 and the plurality of user devices 15 are connected in one-to-multiple correspondence. That is, the lower-level device 14 (an accommodation source device) accommodates a plurality of user devices 15. Hereinafter, a communication line between the lower-level device 14 and the user device 14 will be referred to as a "lower-level network 40."

The user device 15 is a communication device such as a smartphone terminal, a tablet terminal, or a computer terminal. In the communication system 1, these user devices 15-1 to 15-U (U is an integer of 2 or more) are the lowest level devices (low-level-side devices).

Next, a configuration example of the terminal station device 11 will be described.

Figures 2, 3, 4:
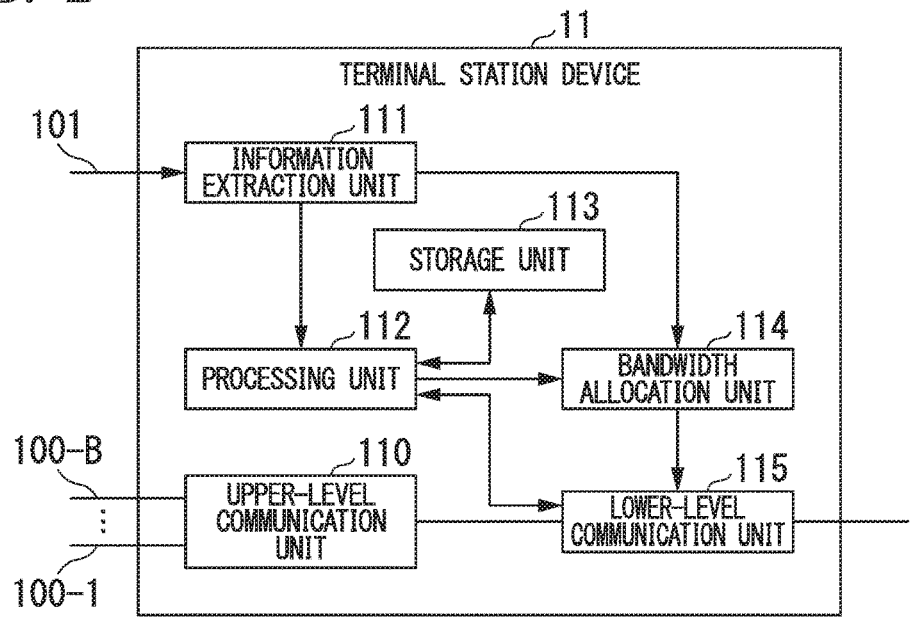
FIG. 2 is a diagram showing a configuration example of a terminal station device according to the first embodiment.
FIG. 3 is a diagram showing an example of correspondence information between an upper-level device, a terminal device, and a lower-level device according to the first embodiment.
FIG. 4 is a diagram showing an example of correspondence information between a terminal device and a user device according to the first embodiment.

FIG. 2 is a diagram showing a configuration example of the terminal station device 11 according to the first embodiment of the present invention. The terminal station device 11 includes an upper-level communication unit 110, an information extraction unit 111, a processing unit 112, a storage unit 113, a bandwidth allocation unit 114, and a lower-level communication unit 115.

Some or all of the upper-level communication unit 110, the information extraction unit 111, the processing unit 112, the bandwidth allocation unit 114, and the lower-level communication unit 115 are software functional units that function when a processor such as a central processing unit (CPU) executes a program stored in a memory, for example. Moreover, some or all of these functional units may be hardware functional units such as large-scale integrated circuit (LSI) or an application specific integrated circuit (ASIC).

The upper-level communication unit 110 transmits main signals acquired from the upper-level device 10 via main signal lines 100-1 to 100-B (B is an integer of 1 or more and equal to or smaller than the number P of terminal devices 13) to the lower-level communication unit 115. The upper-level communication unit 110 is connected to the upper-level device 10 by a B-to-B main signal line.

Moreover, the upper-level communication unit 110 transmits the main signal acquired from the lower-level communication unit 115 to the upper-level device 10 via the main signal lines 100-1 to 100-B.

When scheduling information (information on bandwidth allocation or the like, that is, information on allocation of radio resources to respective user devices 15 in frequency and time axes) of uplink communication of the user device 15 is included in the main signal, the upper-level communication unit 110 may extract scheduling information of the uplink communication of the user device 15 from the main signal and transmit the information to the information extraction unit 111.

Moreover, the upper-level communication unit 110 may determine a destination upper-level device 10 to which the main signal of the uplink communication is transmitted on the basis of the identifier of the upper-level device 10 appended to the main signal of the uplink communication by the lower-level device 14 and the correspondence information (to be described later) stored in the storage unit 113.

When the scheduling information (information on the bandwidth allocation or the like) of the uplink communication of the user device 15 is included in the auxiliary signal, the information extraction unit 111 acquires the scheduling information of the uplink communication of the user device 15 from the upper-level device 10 via the auxiliary signal line 101. The information extraction unit 111 extracts, for respective user devices 15, information on an information amount (hereinafter referred to as an "allowable lower-level network transmission amount") of signals for which transmission of the uplink communication of the user device 15 is allowed in the lower-level network 40 from the acquired scheduling information of the uplink communication of the user device 15. The information extraction unit 111 correlates the user device identifier and the allowable lower-level network transmission amount information and transmits the same to the bandwidth allocation unit 114.

Moreover, the information extraction unit 111 acquires the lower-level device identifier of the lower-level device 14 connected to the upper-level device 10 via the relay network 30 from the upper-level device 10 via the auxiliary signal line 101. The information extraction unit 111 transmits an identifier (hereinafter referred to as an "upper-level device identifier") of the upper-level device 10 and the acquired lower-level device identifier to the processing unit 112.

Furthermore, the information extraction unit 111 acquires the user device identifier of the user device 15 connected to the lower-level device 14, which is correlated with the lower-level device identifier from the upper-level device 10 via the auxiliary signal line 101. The information extraction unit 111 transmits the lower-level device identifier and the user device identifier correlated with each other to the processing unit 112.

The processing unit 112 acquires the identifier (upper-level device identifier) of the upper-level device 10 and the lower-level device identifier from the information extraction unit 111. The processing unit 112 sends a request for the lower-level device identifier of the lower-level device 14-*i* connected to the terminal device 13-*i* to the terminal device 13 via the lower-level communication unit 115 as a response.

That is, the processing unit 112 asks the terminal device 13 about the lower-level device identifier of the lower-level device 14-*i* connected to the terminal device 13-*i* via the lower-level communication unit 115.

In this way, the processing unit 112 acquires the lower-level device identifier of the lower-level device 14-*i* connected to the terminal device 13-*i* from the lower-level communication unit 115 as a response from the terminal device 13. The processing unit 112 stores the upper-level device identifier, the identifier (hereinafter referred to as a "terminal device identifier") of the answering terminal device 13, and the lower-level device identifier in the response in the storage unit 113 in correlation with each other.

FIG. 3 is a diagram showing an example of correspondence information (hereinafter referred to as lower level device and other correspondence information) of the upper-level device 10, the terminal device 13, and the lower-level device 14 according to the first embodiment.

The lower level device and other correspondence information (BBU-ONU-RRH correspondence information) is information indicating the connection relation between the upper-level device 10 and the terminal device 13 and the connection relation between the terminal device 13 and the lower-level device 14. In the lower level device and other correspondence information, the upper-level device identifier, the terminal device identifier, and the lower-level device identifier are correlated with each other.

In FIG. 3, as an example, an upper-level device identifier "10," a terminal device identifier "13-1," and a lower-level device identifier "14-1" are correlated with each other. Moreover, an upper-level device identifier "10," a terminal device identifier "13-*i*," and a lower-level device identifier "14-*i*" are correlated with each other. Furthermore, an upper-level device identifier "10," a terminal device identifier "13-P," and a lower-level device identifier "14-P" are correlated with each other.

When the lower-level device identifier is acquired from the lower-level communication unit 115, the processing unit 112 determines whether the acquired lower-level device identifier is registered in the lower level device and other correspondence information stored in the storage unit 113.

When the lower-level device identifier acquired from the lower-level communication unit 115 is not registered, the processing unit 112 registers the lower-level device identifier acquired from the lower-level communication unit 115 in the lower level device and other correspondence information in correlation with the corresponding terminal device 13.

On the other hand, when the lower-level device identifier acquired from the lower-level communication unit 115 is registered, the processing unit 112 correlates the lower-level device identifier acquired from the lower-level communication unit 115 with the corresponding terminal device 13 to update the lower level device and other correspondence information.

Moreover, the processing unit 112 acquires the lower-level device identifier and the user device identifier correlated with each other from the information extraction unit 111. The processing unit 112 stores the correspondence information (ONU-UE correspondence information) between the terminal device 13 and the user device 15 in the storage unit 113 on the basis of the lower level device and other correspondence information and the lower-level device identifier and the user device identifier correlated with each other.

FIG. 4 is a diagram showing an example of correspondence information (hereinafter referred to as "user device and other correspondence information") between the terminal device 13 and the user device 15 according to the first embodiment.

The user device and other correspondence information indicates the connection relation between the terminal device 13 and the user device 15. In the user device and other correspondence information, the terminal device identifier and the user device identifier are correlated with each other.

In FIG. 4, as an example, a terminal device identifier "13-1" and a user device identifier "15-1" correlated with the lower-level device identifier "14-1" are correlated with each other. Moreover, a terminal device identifier "13-1" and a user device identifier "15-*u*" correlated with the lower-level device identifier "14-1" are correlated with each other. That is, as an example, the terminal device 13-1 is connected to at least the user device 15-1 and the user device 15-*u* via the lower-level device 14-1.

Moreover, in FIG. 4, as an example, a terminal device identifier "13-P" and a user device identifier "15-U" correlated with the lower-level device identifier "14-P" are correlated with each other.

When the user device identifier is acquired from the information extraction unit 111, the processing unit 112 determines whether the acquired user device identifier is registered in the user device and other correspondence information stored in the storage unit 113.

When the user device identifier acquired from the information extraction unit 111 is not registered, the processing unit 112 acquires a terminal device corresponding to the lower-level device identifier acquired from the information extraction unit 111 from the lower level device and other correspondence information and registers the user device identifier acquired from the information extraction unit 111 in the user device and other correspondence information in correlation with the corresponding terminal device 13.

On the other hand, when the user device identifier acquired from the information extraction unit 111 is registered, the processing unit 112 acquires a terminal device corresponding to the lower-level device identifier acquired from the information extraction unit 111 from the lower level device and other correspondence information and correlates the user device identifier acquired from the information extraction unit 111 with the corresponding terminal device 13 to update the user device and other correspondence information.

The processing unit 112 may store the lower level device and other correspondence information and the user device and other correspondence information in the storage unit 113 by putting the same in a single correspondence table.

The storage unit 113 includes a nonvolatile storage medium (non-transitory recording medium) such as a read only memory (ROM), a flash memory, or a hard disk drive (HDD), for example. The storage unit 113 may include a volatile storage medium such as a random access memory (RAM) or a register, for example. The storage unit 113 may store a program for allowing a software functional unit to function, for example.

The storage unit 113 stores the lower level device and other correspondence information and the user device and other correspondence information. The storage unit 113 may store the lower level device and other correspondence information and the user device and other correspondence information by putting the same in a single correspondence table.

The bandwidth allocation unit 114 acquires the lower level device and other correspondence information and the user device and other correspondence information from the processing unit 112. The bandwidth allocation unit 114 determines a bandwidth (hereinafter referred to as a "relay network demand amount") demanded for the uplink communication of the terminal device 13 in the relay network 30 on the basis of the lower level device and other correspondence information, the user device and other correspondence information, and the allowable lower-level network transmission amount information extracted by the information extraction unit 111.

The bandwidth allocation unit 114 calculates an allocation amount of uplink communication signals of the lower-level device 14 on the basis of the relay network demand amount. In a transmission process of the uplink communication signals of the lower-level device 14, an overhead may sometimes occur depending on the uplink communication signals of the user device 15. The overhead mentioned herein indicates a signal other than the main signal of the uplink communication and is control information which is additionally appended to data transmission, for example. Due to this, an information amount or the like corresponding to the overhead may be added to or multiplied by the relay network demand amount.

The bandwidth allocation unit 114 calculates a transmission start time point (allowed relay network transmission start time point) of the uplink communication of the terminal device 13 so that, for example, the waiting period in which the terminal device 13 waits for transmission of uplink communication signals is equivalent for all terminal devices 13. Similarly, the bandwidth allocation unit 114 calculates an information amount (hereinafter referred to as an "allowable relay network transmission amount") of signals for which transmission of the uplink communication of the terminal device 13 is allowed in the relay network 30 on the basis of a result of addition of a redundant bit amount to the allocation amount of uplink communication signals of the lower-level device 14 so that, for example, the waiting period in which the terminal device 13 waits for transmission of uplink communication signals is equivalent for all terminal devices 13. The redundant bit amount mentioned herein is an additional allocation amount for allowing transmission of a control signal which can occur in uplink communication other than data communication, for example.

The bandwidth allocation unit 114 transmits the transmission start time point information of the uplink communication for each terminal device 13 to the lower-level communication unit 115. Moreover, the bandwidth allocation unit 114 transmits the allowable relay network transmission amount information for each terminal device 13 to the lower-level communication unit 115.

The lower-level communication unit 115 transmits the main signal of the downlink communication acquired from the upper-level communication unit 110 to the terminal device 13 via the relay network 30. The lower-level communication unit 115 transmits the main signal of the uplink communication acquired from the terminal device 13 via the relay network 30 to the upper-level communication unit 110.

The lower-level communication unit 115 acquires the transmission start time point information of the uplink communication of each terminal device 13 from the bandwidth allocation unit 114. The lower-level communication unit 115 transmits the transmission start time point information of the uplink communication of the terminal device 13 to the terminal device 13 via the relay network 30. Moreover, the lower-level communication unit 115 acquires the allowable relay network transmission amount information of each terminal device 13 from the bandwidth allocation unit 114. The lower-level communication unit 115 transmits the allowable relay network transmission amount information of each terminal device 13 to the terminal device 13 via the relay network 30.

The lower-level communication unit 115 may determine a destination terminal device 13 to which the main signal of the downlink communication is transmitted on the basis of the lower-level device identifier appended to the main signal of the downlink communication by the upper-level device 10 and the correspondence information stored in the storage unit 113.

Moreover, the lower-level communication unit 115 transmits a signal for requesting the lower-level device identifier of the lower-level device 14 to the terminal device 13 via the relay network 30. The lower-level communication unit 115 acquires the lower-level device identifier of the lower-level device 14-$i$ connected to the terminal device 13-$i$ from the terminal device 13-$i$. The lower-level communication unit 115 transmits the lower-level device identifier of the lower-level device 14 and the identifier of the terminal device 13 in correlation with each other to the processing unit 112.

Next, a configuration example of the terminal device 13 will be described.

Figure 5:
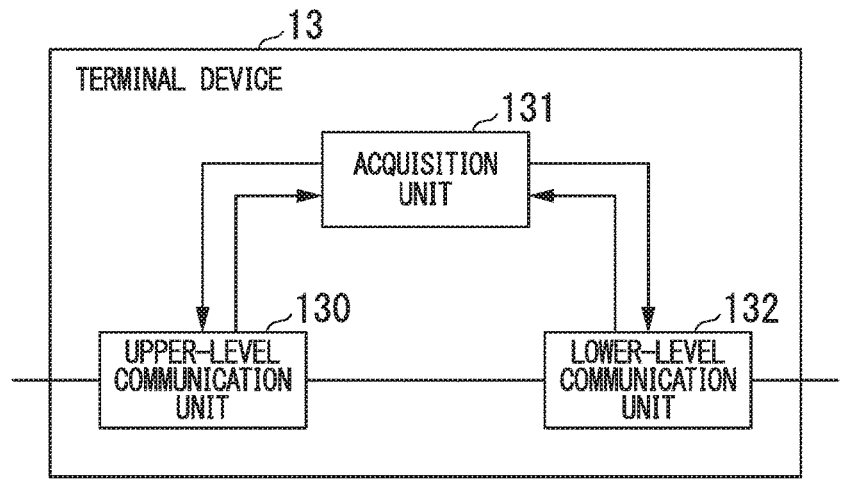
FIG. 5 is a diagram showing a configuration example of a terminal device according to the first embodiment.

FIG. 5 is a diagram showing a configuration example of the terminal device 13 according to the first embodiment.

The terminal device 13 includes an upper-level communication unit 130, an acquisition unit 131, and a lower-level communication unit 132.

Some or all of the upper-level communication unit 130, the acquisition unit 131, and the lower-level communication unit are software functional units that function when a processor such as a CPU (Central Processing Unit) executes a program stored in a memory, for example. Moreover, some or all of these functional units may be hardware functional units such as LSI or ASIC.

The upper-level communication unit 130 transmits a signal for requesting the lower-level device identifier of the lower-level device 14 connected to the own-device to the acquisition unit 131. In this way, the upper-level communication unit 130 acquires the lower-level device identifier from the acquisition unit 131.

The upper-level communication unit 130 transmits the lower-level device identifier of the lower-level device 14 connected to the own-device to the terminal station device 11 via the relay network 30.

The upper-level communication unit 130 transmits the main signal of the uplink communication to the terminal station device 11 at the transmission start time point on the basis of the transmission start time point information of the uplink communication of the terminal device 13. Here, the upper-level communication unit 130 transmits the main signal of the uplink communication adapted to the allowable relay network transmission amount to the terminal station device 11 on the basis of the allowable relay network transmission amount information.

Moreover, the upper-level communication unit 130 acquires the main signal of the downlink communication from the terminal station device 11 via the relay network 30. The upper-level communication unit 130 transmits the main signal of the downlink communication to the lower-level communication unit 132.

The acquisition unit 131 acquires the lower-level device identifier of the lower-level device 14 connected to the own-device from the lower-level communication unit 132. When the signal for requesting the lower-level device identifier is acquired from the upper-level communication unit 130, the acquisition unit 131 transmits the lower-level device identifier of the lower-level device 14 connected to the own-device to the upper-level communication unit 130.

The lower-level communication unit 132 acquires the lower-level device identifier of the lower-level device 14 connected to the subject device from the lower-level device 14. The lower-level communication unit 132 transmits the lower-level device identifier of the lower-level device 14 connected to the own-device to the acquisition unit 131 according to the request from the acquisition unit 131. The lower-level communication unit 132 transmits the main signal of the downlink communication to the lower-level device 14 connected to the own-device.

Next, an operation of the terminal station device 11 creating the lower level device and other correspondence information will be described.

Figure 6:
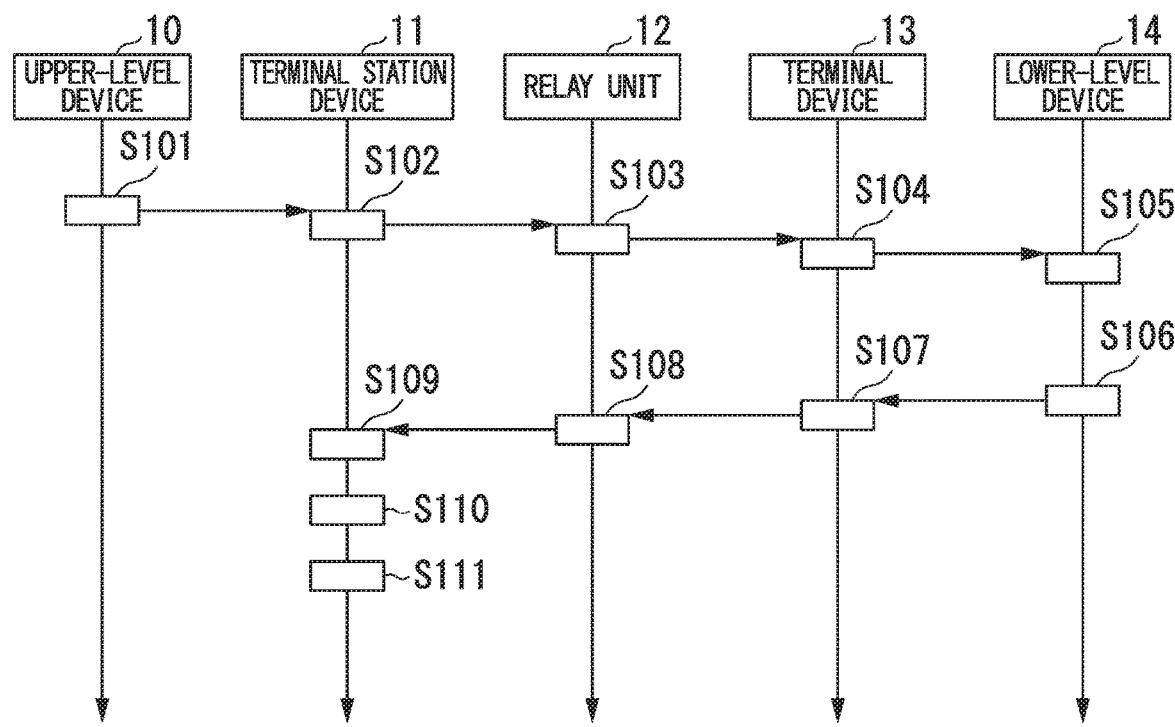
FIG. 6 is a sequence diagram showing a first example of the procedure of an operation of creating correspondence information of an upper-level device, a terminal device, and a lower-level device according to the first embodiment.

FIG. 6 is a sequence diagram showing a first example of the procedure of an operation of creating the lower level device and other correspondence information according to the first embodiment.

The upper-level device 10 transmits the upper-level device identifier of the upper-level device 10 and the lower-level device identifier of the lower-level device 14 connected to the upper-level device 10 to the terminal station device 11 (step S101).

The terminal station device 11 transmits a signal for requesting the lower-level device identifier of the lower-level device 14 connected to the upper-level device 10 to the relay unit 12 (step S102).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S103).

The terminal device 13 transmits a signal for requesting transmission of the lower-level device identifier to the lower-level device 14 connected to the own-device (step S104). The lower-level device 14 acquires the signal for requesting transmission of the lower-level device identifier (step S105). Moreover, the lower-level device 14 transmits the lower-level device identifier of the own-device to the terminal device 13 (step S106).

The terminal device 13 transmits the terminal device identifier of the own-device and the lower-level device identifier of the lower-level device 14 connected to the own-device to the relay unit 12 (step S107). The relay unit 12 transmits the terminal device identifier and the lower-level device identifier to the terminal station device 11 (step S108).

The terminal station device 11 acquires the terminal device identifier and the lower-level device identifier from the terminal device 13 via the relay unit 12 (step S109). The terminal station device 11 determines whether the acquired lower-level device identifier is registered in the lower level device and other correspondence information (BBU-ONU-RRH correspondence information) (step S110).

When the lower-level device identifier is not registered, the terminal station device 11 registers the acquired lower-level device identifier in the lower level device and other correspondence information in correlation with the corresponding terminal device 13. On the other hand, when the acquired lower-level device identifier is registered, the terminal station device 11 correlates the acquired lower-level device identifier with the corresponding terminal device 13 to update the lower level device and other correspondence information (that is, the correspondence between the lower-level device identifier and the terminal device identifier in the lower level device and other correspondence information is changed) (step S111).

The terminal station device 11 may execute the process of the terminal station device 11 shown in FIG. 6 and may execute the process shown in FIG. 6 periodically according to an inquiry and notification of information from the upper-level device 10. Similarly, the terminal device 13 may execute the process of the terminal station device 11 shown in FIG. 6 and may execute the process shown in FIG. 6 periodically according to an inquiry and notification of information from the terminal station device 11.

Figure 7:
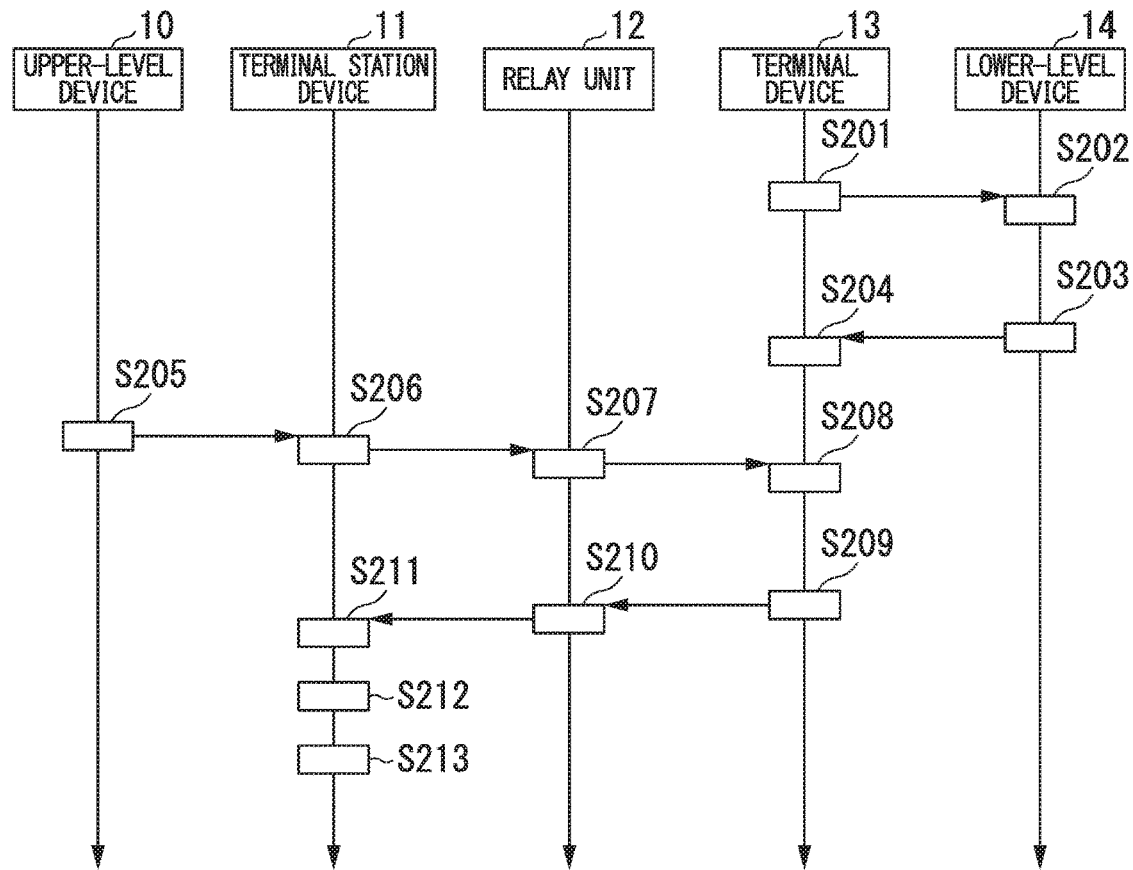
FIG. 7 is a sequence diagram showing a second example of the procedure of an operation of creating correspondence information of an upper-level device, a terminal device, and a lower-level device according to the first embodiment.

FIG. 7 is a sequence diagram showing a second example of the procedure of an operation of creating the lower level device and other correspondence information according to the first embodiment.

As shown in FIG. 7, the terminal device 13 may send a request for transmission of the lower-level device identifier to the lower-level device 14 in advance and store the lower-level device identifier.

That is, the terminal device 13 transmits a signal for requesting transmission of the lower-level device identifier to the lower-level device 14 connected to the own-device (step S201). The lower-level device 14 acquires the signal for requesting transmission of the lower-level device identifier (step S202). In this way, the lower-level device 14 transmits the lower-level device identifier of the own-device to the terminal device 13 (step S203). Moreover, the terminal device 13 stores the terminal device identifier of the own-device and the lower-level device identifier of the lower-level device 14 connected to the subject device (step S204).

The upper-level device 10 transmits the upper-level device identifier of the upper-level device 10 and the lower-level device identifier of the lower-level device 14 connected to the upper-level device 10 to the terminal station device 11 (step S205).

The terminal station device 11 transmits a signal for transmitting the lower-level device identifier of the lower-level device 14 connected to the upper-level device 10 to the relay unit 12 (step S206).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S207).

The terminal device 13 acquires the signal for requesting the lower-level device identifier of the lower-level device 14 (step S208).

The terminal device 13 transmits the terminal device identifier of the own-device and the lower-level device identifier (that stored in step S204) of the lower-level device 14 connected to the own-device to the relay unit 12 (step S209). The relay unit 12 transmits the terminal device identifier and the lower-level device identifier to the terminal station device 11 (step S210).

The terminal station device 11 acquires the terminal device identifier and the lower-level device identifier from the terminal device 13 via the relay unit 12 (step S211). The terminal station device 11 determines whether the acquired lower-level device identifier is registered in the lower level device and other correspondence information (BBU-ONU-RRH correspondence information) (step S212).

When the lower-level device identifier is not registered, the terminal station device 11 registers the acquired lower-level device identifier and the corresponding terminal device 13 in the lower level device and other correspondence information in correlation with each other. On the other hand, when the acquired lower-level device identifier is registered, the terminal station device 11 correlates the acquired lower-level device identifier with the corresponding terminal device 13 to update the lower level device and other correspondence information (that is, similarly to the first example, the correspondence between the lower-level device identifier and the terminal device identifier in the lower level device and other correspondence information is changed) (step S213).

Figure 8:
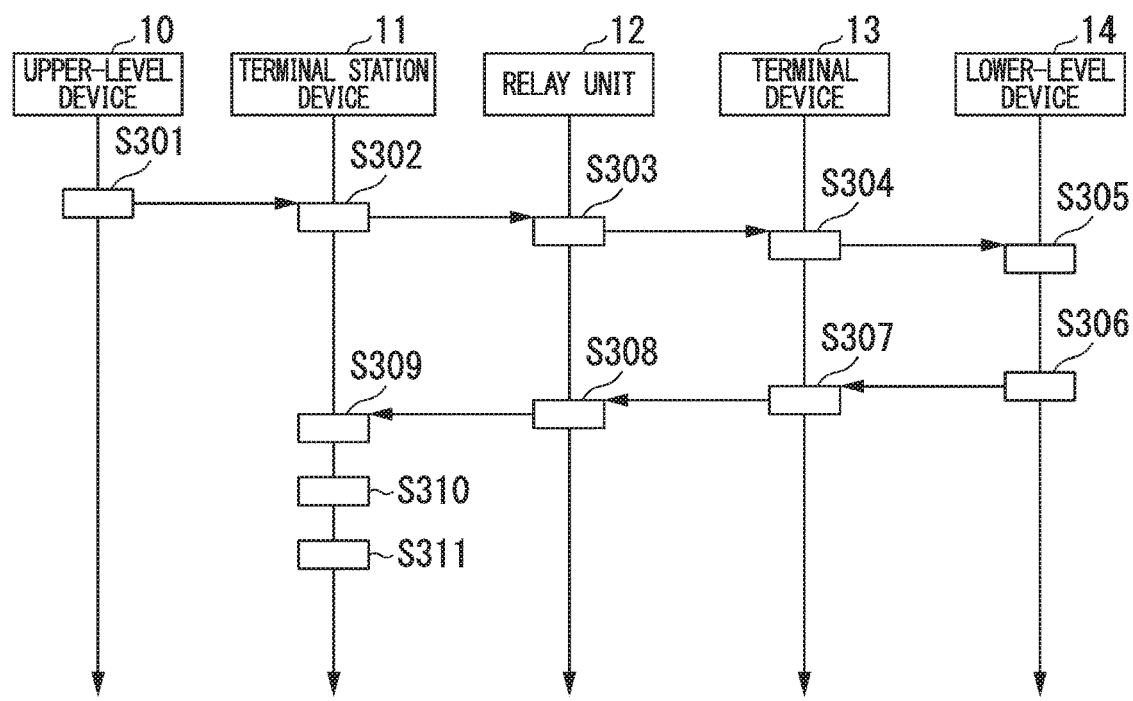
FIG. 8 is a sequence diagram showing a third example of the procedure of an operation of creating correspondence information of an upper-level device, a terminal device, and a lower-level device according to the first embodiment.

FIG. 8 is a sequence diagram showing a third example of the procedure of an example of creating the lower level device and other correspondence information according to the first embodiment. The sequence diagram of FIG. 8 is similar to the flow shown in FIG. 6. In this diagram, the terminal device 13 transmits a signal (message) similarly to the relay unit 12, and the terminal station device 11 and the lower-level device 14 communicate directly with each other.

The upper-level device 10 transmits the upper-level device identifier of the upper-level device 10 and the lower-level device identifier of the lower-level device 14 connected to the upper-level device 10 to the terminal station device 11 (step S301).

The terminal station device 11 transmits a signal for requesting the lower-level device identifier of the lower-level device 14 connected to the upper-level device 10 to the relay unit 12 in order to transmit the signal to the lower-level device 14 (step S302).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S303).

Moreover, the terminal device 13 transmits a signal for requesting transmission of the lower-level device identifier to the lower-level device 14 connected to the own-device as it is (step S304). The lower-level device 14 acquires the signal for requesting transmission of the lower-level device identifier (step S305). Moreover, the lower-level device 14 transmits the lower-level device identifier of the own-device to the terminal device 13 (step S306).

The terminal device 13 transmits the terminal device identifier of the own-device and the lower-level device identifier of the lower-level device 14 connected to the own-device to the relay unit 12 (step S307). The relay unit 12 transmits the terminal device identifier and the lower-level device identifier to the terminal station device 11 (step S308).

The terminal station device 11 acquires the terminal device identifier from the terminal device 13 via the relay unit 12 and acquires the lower-level device identifier from the lower-level device 14 via the relay unit 12 and the terminal device 13 (step S309). The terminal station device 11 determines whether the acquired lower-level device identifier is registered in the lower level device and other correspondence information (BBU-ONU-RRH correspondence information) (step S310).

When the lower-level device identifier is not registered, the terminal station device 11 registers the acquired lower-level device identifier in the lower level device and other correspondence information in correlation with the corresponding terminal device 13. On the other hand, when the acquired lower-level device identifier is registered, the terminal station device 11 correlates the acquired lower-level device identifier with the corresponding terminal device 13 to update the lower level device and other correspondence information (that is, in the third example, the correspondence between the lower-level device identifier and the terminal device identifier in the lower level device and other correspondence information is changed) (step S311).

Next, an operation of the terminal station device 11 creating the user device and other correspondence information will be described.

Figure 9:
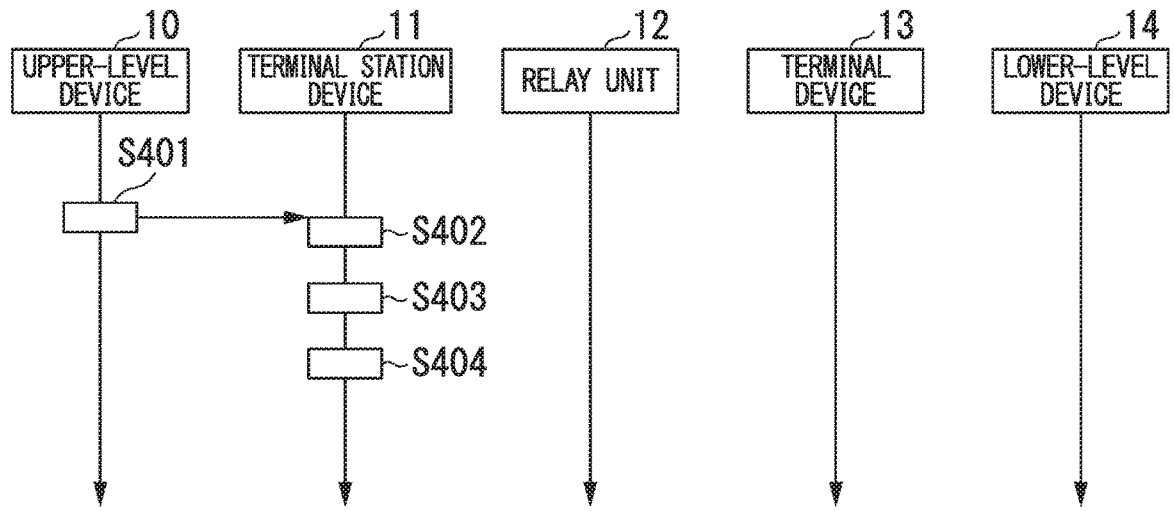
FIG. 9 is a sequence diagram showing an example of the procedure of an operation of creating correspondence information of a terminal device and a user device according to the first embodiment.

FIG. 9 is a sequence diagram showing an example of the procedure of an operation of creating the user device and other correspondence information according to the first embodiment.

The upper-level device 10 transmits the lower-level device identifier of the lower-level device 14 connected to the upper-level device 10 and the user device identifier of the user device 15 connected to the lower-level device 14 to the terminal station device 11 via the relay network 30 (step S401).

The terminal station device 11 acquires the lower-level device identifier of the lower-level device 14 connected to the upper-level device 10 and the user device identifier of the user device 15 connected to the lower-level device 14 via the relay network 30 (step S402).

The terminal station device 11 determines whether the acquired user device identifier is registered in the user device and other correspondence information (step S403).

When the acquired user device identifier is not registered, the terminal station device 11 acquires the terminal device corresponding to the acquired lower-level device identifier from the lower level device and other correspondence information and registers the acquired user device identifier in the user device and other correspondence information in correlation with the corresponding terminal device 13. On the other hand, when the acquired user device identifier is registered, the terminal station device 11 acquires the terminal device corresponding to the acquired lower-level device identifier from the lower level device and other correspondence information and correlates the acquired user device identifier with the corresponding terminal device 13 to update the user device and other correspondence information (that is, the correspondence between the user device identifier and the terminal device identifier in the user device and other correspondence information is changed) (step S404).

As described above, in the terminal station device 11 according to the first embodiment, the terminal device 13 connected to the lower-level device 14 accommodating the plurality of user devices 15 is connected on a lower level side and the upper-level device 10 is connected on an upper-level side.

The information extraction unit 111 of the terminal station device 11 extracts information on allocation of a bandwidth of the uplink communication of each user device 15 from the information (for example, the scheduling information of the uplink communication) of the uplink communication of the user device 15 notified from the upper-level device 10.

The processing unit 112 of the terminal station device 11 creates correspondence information indicating the correlation among the upper-level device 10, the terminal device 13, the lower-level device 14, and the user device 15. The correspondence information may indicate the correlation among the upper-level device 10, the terminal station device 11, the terminal device 13, the lower-level device 14, and the user device 15.

The bandwidth allocation unit 114 of the terminal station device 11 allocates the start time point of the uplink communication of the terminal device 13 and an information amount of signals for which transmission of the uplink communication of the terminal device 13 is allowed to the terminal device 13 on the basis of the information on allocation of the bandwidth of the uplink communication of each user device 15 and the correspondence information.

With this configuration, the terminal station device 11 creates correspondence information indicating the correlation among the upper-level device 10, the terminal device 13, the lower-level device 14, and the user device 15. The terminal station device 11 can identify the connection relation of respective devices on the basis of this correspondence information.

The terminal station device 11 can determine the start time point of the uplink communication of the terminal device 13 and the information amount of signals for which transmission is allowed on the basis of the identification result of the connection relation of respective devices and the scheduling information of each user device 15 notified from the upper-level device 10.

In this way, according to the terminal station device 11 and the bandwidth allocation method of the first embodiment, it is possible to improve the utilization efficiency of the bandwidth of the communication system in which the lower-level device 14 and the user devices 15 are connected in one-to-multiple correspondence.

In the terminal station device 11 and the bandwidth allocation method of the first embodiment, the bandwidth allocation to the terminal device 13 is performed on the basis of the scheduling information from the upper-level device 10 to the lower-level device 14. Moreover, according to the terminal station device 11 and the bandwidth allocation method of the first embodiment, it is possible to utilize the bandwidth of a PON or the like by signal control on the lower-level device 14. Therefore, the terminal station device 11 and the bandwidth allocation method according to the first embodiment can decrease the latency of the uplink communication signal transmission.

The terminal station device 11 of the first embodiment further includes the lower-level communication unit 115 that receives the identification information of the lower-level device 14 connected on the lower level side of the terminal device 13 from the terminal device 13. The information extraction unit 111 extracts information indicating the correlation between the upper-level device 10 and the lower-level device 14 from the scheduling information notified from the upper-level device 10 as information on the uplink communication of the user device 15.

The processing unit 112 creates information indicating the correspondence of the connection among the upper-level device 10, the terminal station device 11, the terminal device 13, the lower-level device 14, and the user device 15 on the basis of the extracted information indicating the correlation between the upper-level device 10 and the lower-level device 14.

The storage unit 113 stores information indicating the correspondence of the connection among the upper-level device 10, the terminal device 13, and the lower-level device 14 and information indicating the correspondence of the connection between the terminal device 13 and the user device 15 as information indicating the correspondence of the connection among the upper-level device 10, the terminal station device 11, the terminal device 13, the lower-level device 14, and the user device 15.

The terminal station device 11 of the first embodiment can determine the transmission start time point and the allowable transmission amount of signals for each terminal device 13 on the basis of the scheduling information of each user device 15. Therefore, the terminal station device 11 of the first embodiment can transmit uplink communication signals and downlink communication signals to a desired upper-level device 10 and a desired terminal device 13.

Second Embodiment

A second embodiment shows a process when the terminal station device 11 cannot acquire a lower-level device identifier from the terminal device 13 due to an abnormality occurring in the lower-level device 14, which is a difference from the first embodiment. In the second embodiment, only differences from the first embodiment will be described.

Figure 10:
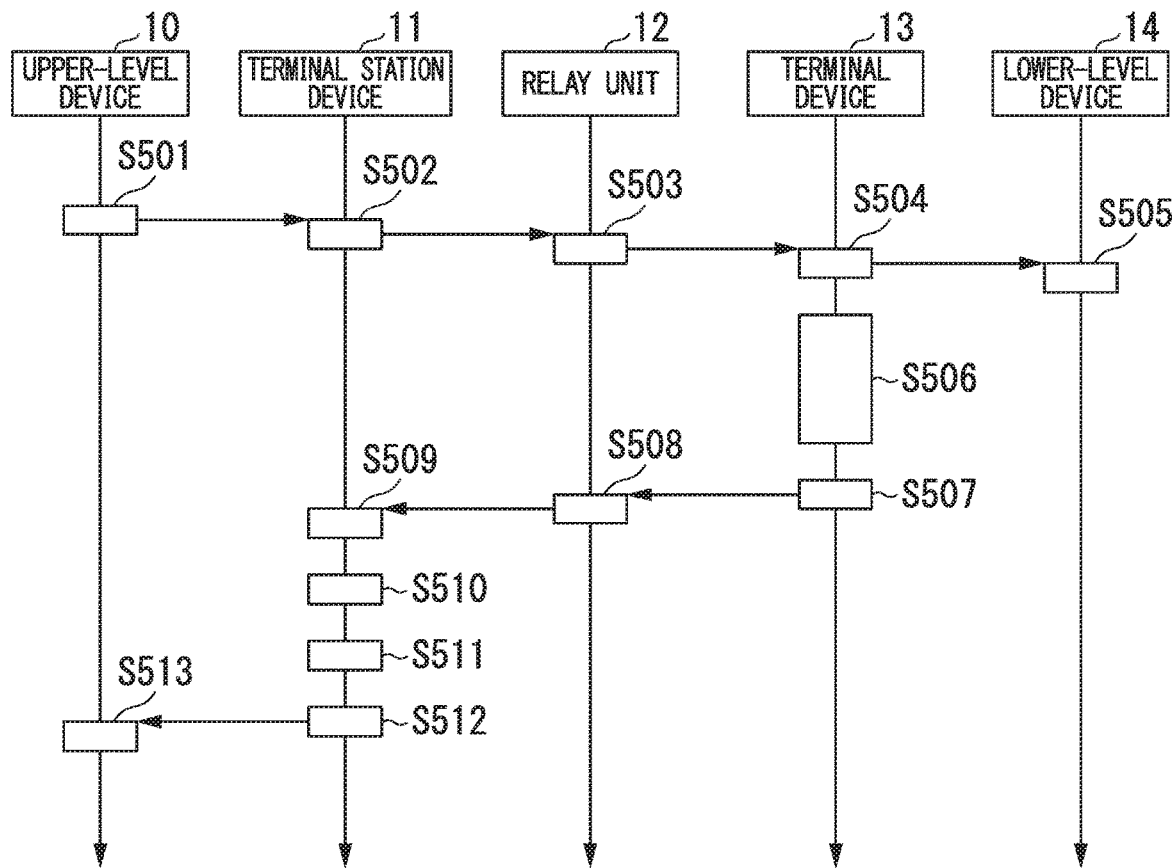
FIG. 10 is a sequence diagram showing a first example of the procedure of an operation when an abnormality occurs in a lower-level device according to a second embodiment of the present invention.

FIG. 10 is a sequence diagram showing a first example of the procedure of an operation when an abnormality occurs in the lower-level device 14 according to the second embodiment of the present invention.

The upper-level device 10 transmits the upper-level device identifier of the upper-level device 10 and the lower-level device identifier of the lower-level device 14 connected to the upper-level device 10 to the terminal station device 11 (step S501).

The terminal station device 11 transmits a signal for requesting the lower-level device identifier of the lower-level device 14 connected to the upper-level device 10 to the relay unit 12 (step S502).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S503).

The terminal device 13 transmits a signal for requesting transmission of the lower-level device identifier to the lower-level device 14 connected to the own-device (step S504). The lower-level device 14 acquires the signal for requesting transmission of the lower-level device identifier (step S505).

The terminal device 13 determines whether the lower-level device identifier (for which transmission is requested) is acquired from the lower-level device 14 within a predetermined period (threshold period) (step S506).

When the lower-level device identifier is not acquired from the lower-level device 14 within the predetermined period, the terminal device 13 transmits lower-level device error information indicating the occurrence of an abnormality in the lower-level device 14 to the relay unit 12 toward the terminal station device 11 (step S507).

The relay unit 12 transmits the lower-level device error information to the terminal station device 11 (step S508).

The terminal station device 11 acquires the lower-level device error information from the terminal device 13 via the relay unit 12 (step S509). The terminal station device 11 determines whether the terminal device having received the lower-level device error information is registered in the lower level device and other correspondence information (BBU-ONU-RRH correspondence information).

When the terminal device having received the lower-level device error information is registered, the terminal station device 11 removes the information correlated with the terminal device from the lower level device and other correspondence information (step S510).

Moreover, the terminal station device 11 determines whether the terminal device having received the lower-level device error information is registered in the user device and other correspondence information (ONU-UE correspondence information). When the terminal device having received the lower-level device error information is registered, the terminal station device 11 removes the information correlated with the terminal device from the user device and other correspondence information (step S511).

The terminal station device 11 transmits the lower-level device error information indicating the occurrence of an abnormality in the lower-level device 14 to the upper-level device 10 (step S512). The upper-level device 10 acquires the lower-level device error information (step S513).

Figure 11:
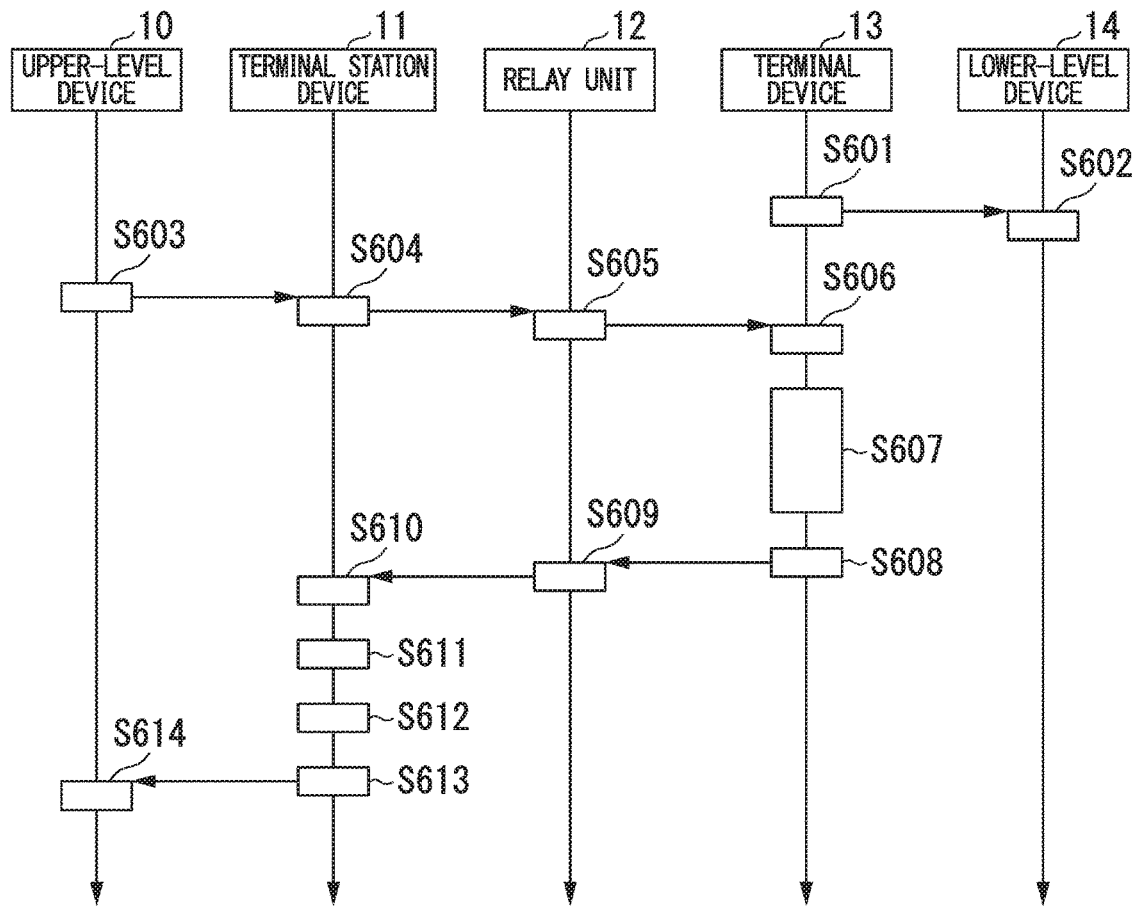
FIG. 11 is a sequence diagram showing a second example of the procedure of an operation when an abnormality occurs in a lower-level device according to the second embodiment.

FIG. 11 is a sequence diagram showing a second example of the procedure of an operation when an abnormality occurs in the lower-level device 14 according to the second embodiment of the present invention.

The terminal device 13 transmits a signal for requesting transmission of the lower-level device identifier to the lower-level device 14 connected to the own-device (step S601). The lower-level device 14 acquires the signal for requesting transmission of the lower-level device identifier (step S602).

The upper-level device 10 transmits the upper-level device identifier of the upper-level device 10 and the lower-level device identifier of the lower-level device 14 connected to the upper-level device 10 to the terminal station device 11 (step S603).

The terminal station device 11 transmits a request for requesting the lower-level device identifier of the lower-level device 14 connected to the upper-level device 10 to the relay unit 12 (step S604).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S605).

The terminal device 13 acquires the signal for requesting the lower-level device identifier of the lower-level device 14 connected to the upper-level device 10 (step S606).

The terminal device 13 determines whether the lower-level device identifier is acquired (in steps S601 and S602) from the lower-level device 14 within a predetermined period (step S607).

When the lower-level device identifier is not received from the lower-level device 14 within the predetermined period, the terminal device 13 transmits the lower-level device error information indicating the occurrence of an abnormality in the lower-level device 14 to the relay unit 12 toward the terminal station device 11 (step S608).

The relay unit 12 transmits the lower-level device error information to the terminal station device 11 (step S609).

The terminal station device 11 acquires the lower-level device error information from the terminal device 13 via the relay unit 12 (step S610). The terminal station device 11 determines whether the terminal device having received the lower-level device error information is registered in the lower level device and other correspondence information (BBU-ONU-RRH correspondence information).

When the terminal device having received the lower-level device error information is registered, the terminal station device 11 removes the information correlated with the terminal device from the lower level device and other correspondence information (step S611).

Moreover, the terminal station device 11 determines whether the terminal device having received the lower-level device error information is registered in the user device and other correspondence information (ONU-UE correspondence information). When the terminal device having received the lower-level device error information is registered, the terminal station device 11 removes the information correlated with the terminal device from the user device and other correspondence information (step S612).

Moreover, the terminal station device 11 transmits the lower-level device error information indicating the occurrence of an abnormality in the lower-level device 14 to the upper-level device 10 (step S613). The upper-level device 10 acquires the lower-level device error information (step S614).

Figure 12:
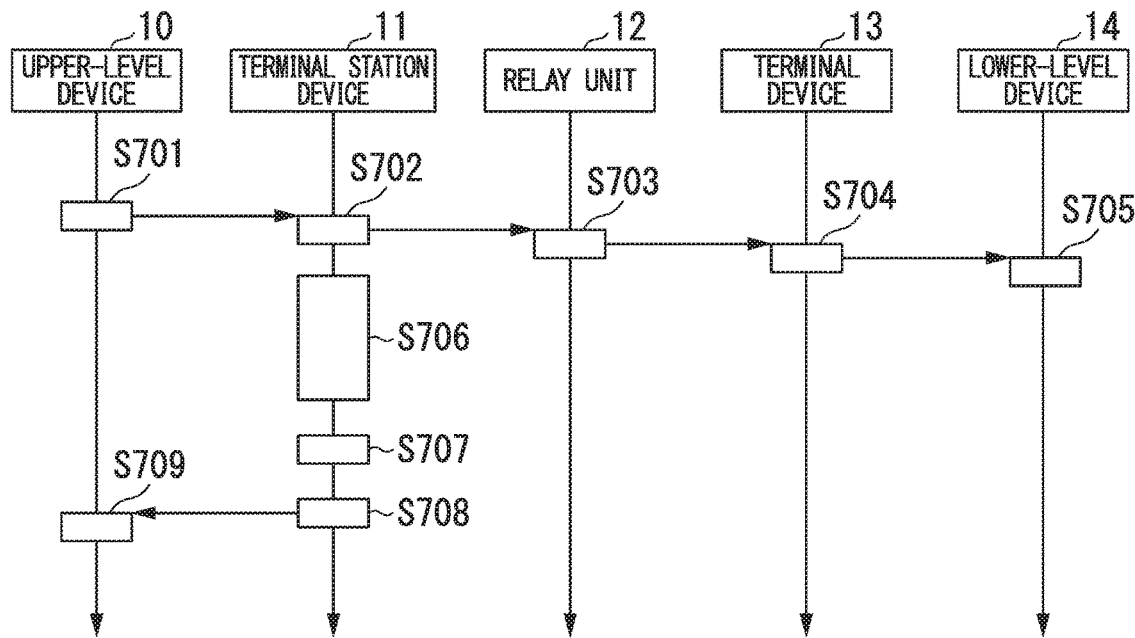
FIG. 12 is a sequence diagram showing a third example of the procedure of an operation when an abnormality occurs in a lower-level device according to the second embodiment.

FIG. 12 is a sequence diagram showing a third example of the procedure of an operation when an abnormality occurs in the lower-level device 14 according to the second embodiment of the present invention. In FIG. 12, the terminal device 13 also transmits a signal (message) similarly to the relay unit 12, and the terminal station device 11 and the lower-level device 14 communicate directly with each other.

The upper-level device 10 transmits the upper-level device identifier of the upper-level device 10 and the lower-level device identifier of the lower-level device 14 connected to the upper-level device 10 to the terminal station device 11 (step S701).

The terminal station device 11 transmits a signal for requesting the lower-level device identifier of the lower-level device 14 connected to the upper-level device 10 to the relay unit 12 toward the lower-level device 14 (step S702).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S703).

Moreover, the terminal device 13 transmits the signal for requesting transmission of the lower-level device identifier to the lower-level device 14 connected to the own-device as it is (step S704). The lower-level device 14 acquires the signal for requesting transmission of the lower-level device identifier (step S705).

The terminal station device 11 determines whether the lower-level device identifier is acquired from the lower-level device 14 within a predetermined period (step S706). When the lower-level device identifier is not acquired from the lower-level device 14 within the predetermined period, the terminal station device 11 determines whether the lower-level device identifier of the destination lower-level device 14 is registered in the lower level device and other correspondence information (BBU-ONU-RRH correspondence information).

When the lower-level device identifier of the destination lower-level device 14 is registered, the terminal station device 11 removes the lower-level device identifier of the destination lower-level device 14 and the terminal device identifier of the terminal device 13 correlated with the lower-level device identifier of the destination lower-level device 14 from the lower level device and other correspondence information (step S707).

Moreover, the terminal station device 11 transmits device error information indicating the occurrence of an error in the terminal device 13 or the lower-level device 14 to the upper-level device 10 (step S708). The upper-level device 10 acquires the device error information (step S709).

As described above, the terminal station device 11 of the second embodiment removes the lower-level device identifier of the destination lower-level device 14 and the terminal device identifier of the terminal device 13 correlated with the lower-level device identifier from the lower level device and other correspondence information when an abnormality occurs in the lower-level device 14.

In this way, according to the terminal station device 11 and the bandwidth allocation method of the second embodiment, it is possible to improve the bandwidth utilization efficiency even when the terminal station device 11 cannot acquire the lower-level device identifier from the terminal device 13 due to the occurrence of an abnormality in the lower-level device 14 in the communication system 1 in which the lower-level device 14 and the user devices 15 are connected in one-to-multiple correspondence.

Third Embodiment

A third embodiment shows a process when the terminal station device 11 cannot acquire the lower-level device identifier from the terminal device 13 due to an abnormality occurring in the terminal device 13, which is a difference from the second embodiment. In the third embodiment, only differences from the second embodiment will be described.

Figure 13:
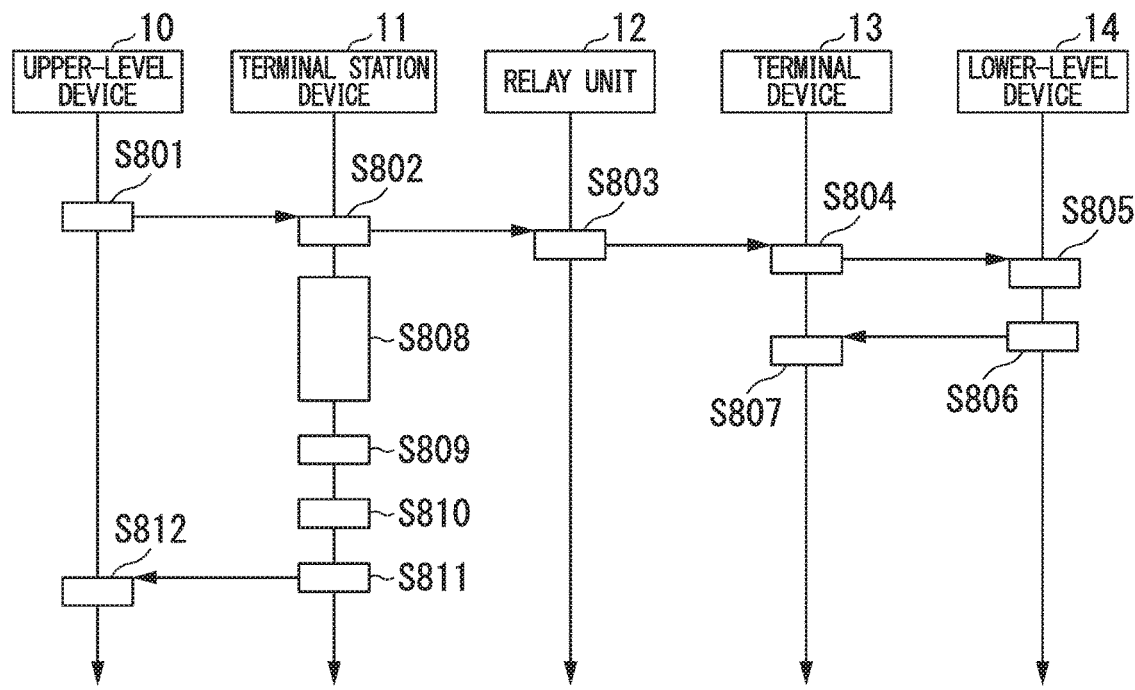
FIG. 13 is a sequence diagram showing a first example of the procedure of an operation when an abnormality occurs in a terminal device according to a third embodiment of the present invention.

FIG. 13 is a sequence diagram showing a first example of the procedure of an operation when an abnormality occurs in the terminal device 13 according to the third embodiment of the present invention.

The upper-level device 10 transmits the upper-level device identifier of the upper-level device 10 and the lower-level device identifier of the lower-level device 14 connected to the upper-level device 10 to the terminal station device 11 (step S801).

The terminal station device 11 transmits a signal for requesting the lower-level device identifier of the lower-level device 14 connected to the upper-level device 10 to the relay unit 12 (step S802).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S803).

The terminal device 13 transmits a signal for requesting transmission of the lower-level device identifier to the lower-level device 14 connected to the own-device (step S804). The lower-level device 14 acquires the signal for requesting transmission of the lower-level device identifier (step S805). Moreover, the lower-level device 14 transmits the lower-level device identifier of the own-device to the terminal device 13 (step S806).

The terminal device 13 acquires the lower-level device identifier of the lower-level device 14 connected to the own-device (step S807).

The terminal station device 11 determines whether the lower-level device identifier (for which transmission is requested) is acquired from the terminal device 13 within a predetermined period (step S808).

When the lower-level device identifier is not acquired from the terminal device 13 within the predetermined period, the terminal station device 11 determines whether the lower-level device identifier of the lower-level device 14 correlated with the destination terminal device 13 is registered in the lower level device and other correspondence information (BBU-ONU-RRH correspondence information).

When the lower-level device identifier of the lower-level device 14 correlated with the destination terminal device 13 is registered, the terminal station device 11 removes the lower-level device identifier of the lower-level device 14 correlated with the destination terminal device 13 and the terminal device identifier of the destination terminal device 13 from the lower level device and other correspondence information (step S809).

Moreover, the terminal station device 11 determines whether the lower-level device identifier of the lower-level device 14 correlated with the destination terminal device 13 is registered in the user device and other correspondence information (ONU-UE correspondence information).

When the lower-level device identifier of the lower-level device 14 correlated with the destination terminal device 13 is registered, the terminal station device 11 removes the lower-level device identifier of the lower-level device 14 correlated with the destination terminal device 13 and the user device identifier of the user device 15 correlated with the lower-level device identifier from the user device and other correspondence information (step S810).

The terminal station device 11 transmits terminal device error information indicating the occurrence of an abnormality in the terminal device 13 to the upper-level device 10 (step S811). The upper-level device 10 acquires the terminal device error information (step S812).

Figure 14:
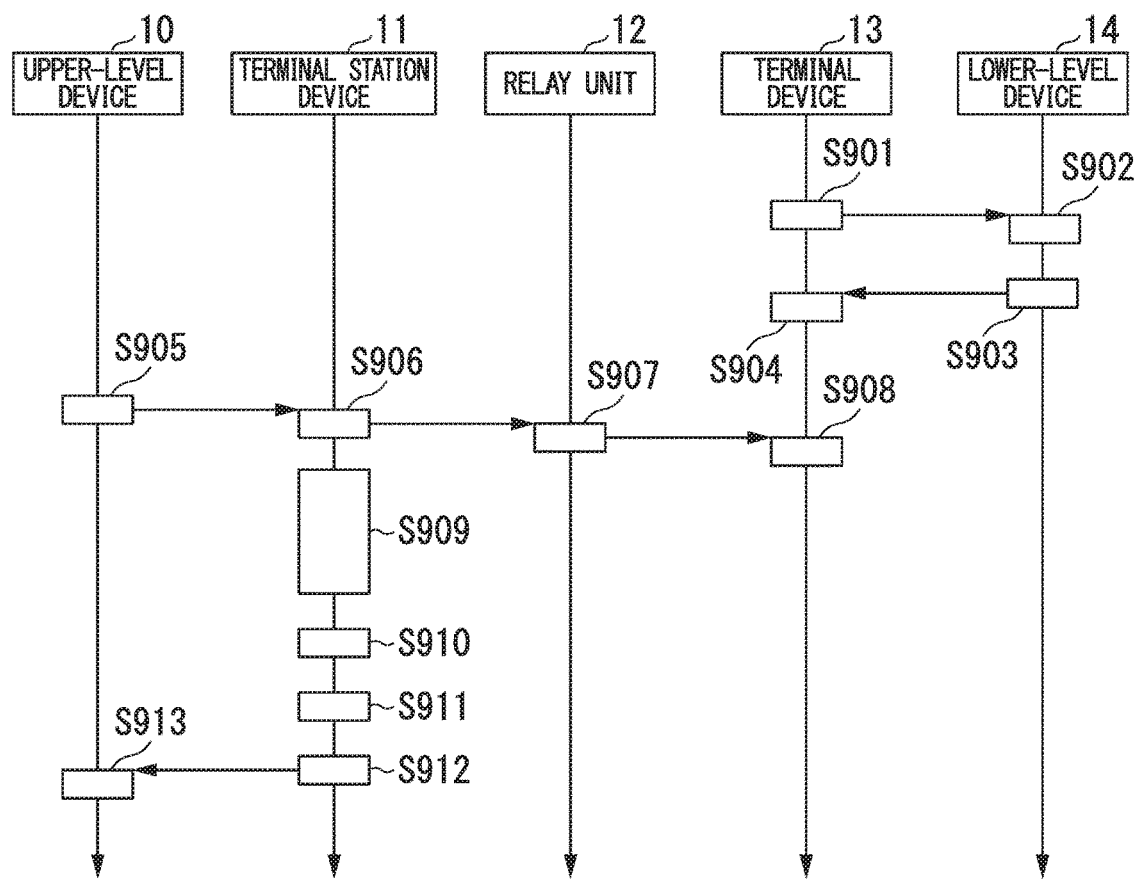
FIG. 14 is a sequence diagram showing a second example of the procedure of an operation when an abnormality occurs in a terminal device according to the third embodiment.

FIG. 14 is a sequence diagram showing a second example of the procedure of an operation when an abnormality occurs in the terminal device 13 according to the third embodiment of the present invention.

The terminal device 13 transmits a signal for requesting transmission of the lower-level device identifier to the lower-level device 14 connected to the own-device (step S901). The lower-level device 14 acquires the signal for requesting transmission of the lower-level device identifier (step S902).

In this way, the lower-level device 14 transmits the lower-level device identifier of the own-device to the terminal device 13 (step S903). Moreover, the terminal device 13 acquires the lower-level device identifier of the lower-level device 14 connected to the own-device (step S904).

The upper-level device 10 transmits the upper-level device identifier of the upper-level device 10 and the lower-level device identifier of the lower-level device 14 connected to the upper-level device 10 to the terminal station device 11 (step S905).

The terminal station device 11 transmits a signal for transmitting the lower-level device identifier of the lower-level device 14 connected to the upper-level device 10 to the relay unit 12 (step S906).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S907).

The terminal device 13 acquires the signal for requesting the lower-level device identifier of the lower-level device 14 (step S908).

The terminal station device 11 determines whether the lower-level device identifier is acquired from the terminal device 13 within a predetermined period (step S909).

When the lower-level device identifier is not acquired from the terminal device 13 within the predetermined period, the terminal station device 11 determines whether the lower-level device identifier of the lower-level device 14 correlated with the destination terminal device 13 is registered in the lower level device and other correspondence information (BBU-ONU-RRH correspondence information). When the lower-level device identifier is registered, the terminal station device 11 removes the lower-level device identifier of the lower-level device 14 correlated with the destination terminal device 13 and the terminal device identifier of the destination terminal device 13 from the lower level device and other correspondence information (step S910).

Moreover, the terminal station device 11 determines whether the lower-level device identifier of the lower-level device 14 correlated with the destination terminal device 13 is registered in the user device and other correspondence information (ONU-UE correspondence information). When the lower-level device identifier is registered, the terminal station device 11 removes the lower-level device identifier of the lower-level device 14 correlated with the destination terminal device 13 and the user device identifier of the user device 15 correlated with the lower-level device identifier from the user device and other correspondence information (step S911).

The terminal station device 11 transmits terminal device error information indicating the occurrence of an abnormality in the terminal device 13 to the upper-level device 10 (step S912). The upper-level device 10 acquires the terminal device error information (step S913).

Figure 15:
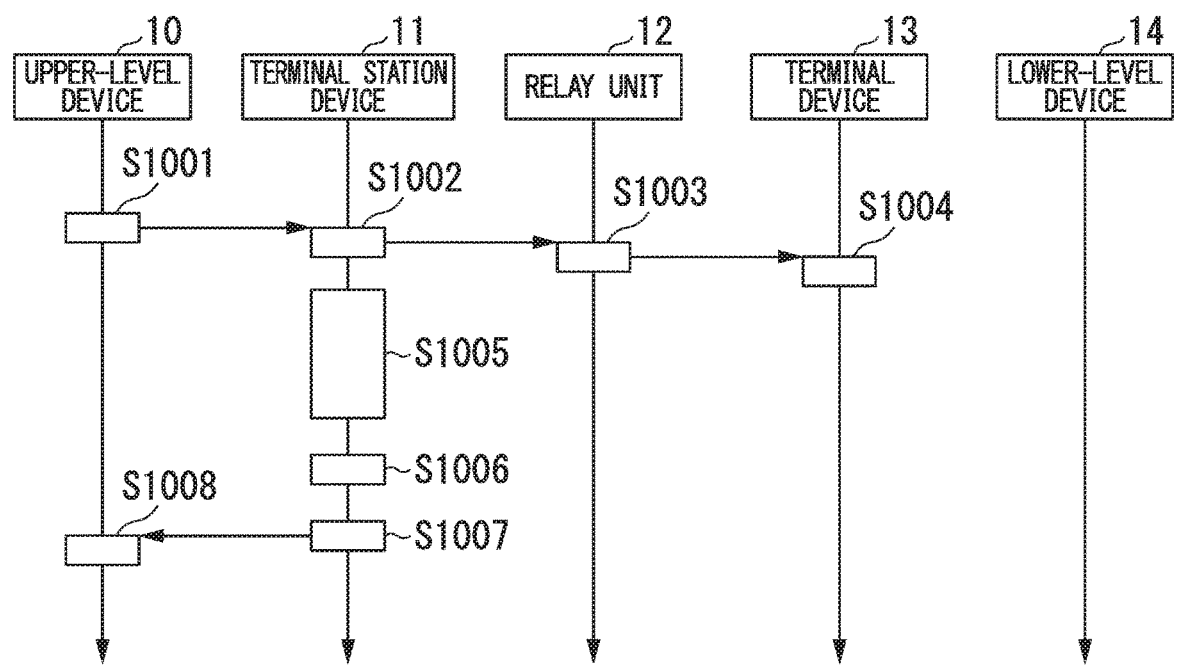
FIG. 15 is a sequence diagram showing a third example of the procedure of an operation when an abnormality occurs in a terminal device according to the third embodiment.

FIG. 15 is a sequence diagram showing a third example of the procedure of an operation when an abnormality occurs in the terminal device 13 according to the third embodiment of the present invention. In FIG. 15, it is assumed that the terminal device 13 transmits a signal (message) similarly to the relay unit 12, and the terminal station device 11 and the lower-level device 14 communicate directly with each other.

The upper-level device 10 transmits the upper-level device identifier of the upper-level device 10 and the lower-level device identifier of the lower-level device 14 connected to the upper-level device 10 to the terminal station device 11 (step S1001).

The terminal station device 11 transmits a signal for requesting the lower-level device identifier of the lower-level device 14 connected to the upper-level device 10 to the relay unit 12 toward the lower-level device 14 (step S1002).

The relay unit 12 transmits a signal for requesting the lower-level device identifier of the lower-level device 14 connected to the upper-level device 10 to the terminal device 13 connected to the lower-level device 14 to which the lower-level device identifier is allocated (step S1003).

The terminal device 13 acquires the signal for requesting transmission of the lower-level device identifier. When an abnormality does not occur in the own-device, the terminal device 13 transmits the acquired signal to the lower-level device 14 as it is (step S1004).

The terminal station device 11 determines whether the lower-level device identifier is acquired from the lower-level device 14 within a predetermined period (step S1005). When the lower-level device identifier is not acquired from the lower-level device 14 within the predetermined period, the terminal station device 11 determines whether the lower-level device identifier of the destination lower-level device 14 is registered in the lower level device and other correspondence information (BBU-ON U-RRH correspondence information).

When the lower-level device identifier of the destination lower-level device 14 is registered, the terminal station device 11 removes the lower-level device identifier of the destination lower-level device 14 and the terminal device identifier of the terminal device 13 correlated with the lower-level device identifier of the destination lower-level device 14 from the lower level device and other correspondence information (step S1006).

The terminal station device 11 transmits device error information indicating the occurrence of an error in the terminal device 13 or the lower-level device 14 to the upper-level device 10 (step S1007). The upper-level device 10 acquires the device error information (step S1008).

As described above, the terminal station device 11 of the third embodiment removes the lower-level device identifier of the lower-level device 14 correlated with the destination terminal device 13 and the terminal device identifier of the terminal device 13 correlated with the lower-level device identifier from the lower level device and other correspondence information when an abnormality occurs in the terminal device 13.

In this way, according to the terminal station device 11 and the bandwidth allocation method of the third embodiment, it is possible to improve the bandwidth utilization efficiency even when the terminal station device 11 cannot acquire the lower-level device identifier from the terminal device 13 due to the occurrence of an abnormality in the terminal device 13 in the communication system 1 in which the lower-level device 14 and the user devices 15 are connected in one-to-multiple correspondence.

The upper-level device, the terminal station device, the terminal device, the lower-level device, the user device, and the communication system according to the above-described embodiments may be implemented by a computer. In this case, a program for implementing this function may be recorded on a computer-readable recording medium and the program recorded on the recording medium may be read and executed by a computer system whereby the function is implemented.

The "computer system" mentioned herein includes an OS and hardware such as peripheral devices. Moreover, the "computer-readable recording medium" means a portable medium such as a flexible disk, an opto-magnetic disc, a ROM, or a CD-ROM and a storage device such as a hard disk included in a computer system.

Furthermore, the "computer-readable recording medium" may include a medium for temporarily and dynamically storing programs, like a communication cable when a program is transmitted via a network such as the Internet or a communication line such as a telephone line, and a medium for storing programs for a predetermined period, like a volatile memory inside a computer system that serves as a server or a client in that case.

Moreover, the program may be a program for implementing some of the above-mentioned functions or a program capable of implementing the above-mentioned functions in combination with the program which has been recorded on the computer system. The program may be implemented using a programmable logic device such as FPGA (Field Programmable Gate Array).

The embodiments of the present invention have been described with reference to the drawings. However, the specific configuration is not limited to the above-described embodiment and the present invention also includes a change in the design within the scope and spirit of the invention.

INDUSTRIAL APPLICABILITY

According to the terminal station device and the bandwidth allocation method of the present invention, it is possible to improve the utilization efficiency of the bandwidth of the communication system in which a lower-level device and user devices are connected in one-to-multiple correspondence.

REFERENCE SIGNS LIST

1 Communication system
10 Upper-level device
11 Terminal station device
12 Relay unit
13 Terminal device
14 Lower-level device
15 User device
20 Upper-level network
30 Relay network
40 Lower-level network
100 Main signal line
101 Auxiliary signal line
110 Upper-level communication unit
111 Information extraction unit
112 Processing unit
113 Storage unit
114 Bandwidth allocation unit
115 Lower-level communication unit
120 Optical fiber
130 Upper-level communication unit
131 Acquisition unit
132 Lower-level communication unit

The invention claimed is:

1. A terminal station device which is connected to an upper-level device on an upper-level side and terminal devices on a lower-level side, the terminal devices being connected to respective lower-level devices accommodating a plurality of user devices, the terminal station device comprising:
  a processor;
  a storage medium having computer program instructions stored thereon, wherein the computer program instructions, when executed by the processor, perform processing of:
  a communication circuit that receives scheduling information on the uplink communication of the plurality of user devices from the upper-level device;
  an information extraction circuit that extracts a bandwidth of uplink communication allocated to each of the plurality of user devices from the scheduling information received by the communication circuit and acquires a lower-level device identifier and a user device identifier associated with each other from the upper-level device, one of the plurality of user devices indicated by the user device identifier being accommodated by one lower-level device of the lower-level devices indicated by the lower-level device identifier;
  a processing circuit that creates correspondence information indicating a correspondence among the upper-level device, the terminal devices, the lower-level devices, and the plurality of user devices and updates, on a basis of the lower-level device identifier and the user device identifier, the correspondence information so that the correspondence information indicates which of the plurality of user devices each of the lower-level devices connects to; and
  a bandwidth allocation circuit that acquires, for each one terminal device of the terminal devices, a user device identifier identifying a user device of the plurality of user devices on a basis of the updated correspondence information, the user device being accommodated in a lower-level device connected to the one terminal device among the lower-level devices, and the bandwidth allocation circuit allocating, for each one terminal device of the terminal devices, a start time point of the uplink communication and an information amount of signals for which transmission of the uplink communication is allowed on a basis of a bandwidth of uplink communication allocated to the user device that is identified by the user device identifier acquired by the bandwidth allocation circuit.

2. The terminal station device according to claim 1, further comprising:
  a communication circuit that receives identification information of the lower-level devices connected to the lower-level side of the terminal devices from the terminal devices, wherein:
  the information extraction circuit further extracts information indicating a correspondence between the upper-level device and the lower-level devices from the information notified by the upper-level device on the uplink communication of the plurality of user devices; and
  the processing circuit creates the correspondence information on a basis of the extracted information on the correspondence between the upper-level device and the lower-level devices.

3. The terminal station device according to claim 1, wherein
  the processing circuit obtains information indicating a correspondence among the upper-level device, the lower-level devices, and the plurality of user devices from the upper-level device and obtains information indicating a correspondence between the terminal devices and the lower-level devices from the terminal devices to create the correspondence information.

4. The terminal station device according to claim 1, further comprising:
a communication circuit that transmits a signal for requesting a response to the lower-level devices,
wherein the processing circuit removes a correspondence related to a lower-level device that does not respond within a predetermined period in response to the signal from the correspondence information.

5. The terminal station device according to claim 1, wherein the bandwidth allocation circuit allocates, for each of the terminal devices, the start time point of the uplink communication and the information amount of signals for which transmission of the uplink communication is allowed on a basis of the bandwidth of the uplink communication allocated to each of the plurality of user devices that is accommodated in the lower-level devices connected to the terminal devices, and
wherein each of the plurality of user devices is corresponded to any one of the terminal devices on the updated correspondence information.

6. A bandwidth allocation method in a terminal station device which is connected to an upper-level device on an upper-level side and terminal devices on a lower-level side, the terminal devices being connected to respective lower-level devices accommodating a plurality of user devices, the bandwidth allocation method comprising:
receiving scheduling information on the uplink communication of the plurality of user devices from the upper-level device;
extracting a bandwidth of uplink communication allocated to each of the plurality of user devices from the scheduling information;
creating correspondence information indicating a correspondence among the upper-level device, the terminal devices, the lower-level devices, and the plurality of user devices;
acquiring a lower-level device identifier and a user device identifier associated with each other from the upper-level device, one of the plurality of user devices indicated by the user device identifier being accommodated by one lower-level device of the lower-level devices indicated by the lower-level device identifier;
updating, on a basis of the lower-level device identifier and the user device identifier, the correspondence information so that the correspondence information indicates which of the plurality of user devices each of the lower-level devices connects to; and
acquiring, for each one terminal device of the terminal devices, a user device identifier identifying a user device of the plurality of user devices on a basis of the updated correspondence information, the user device being accommodated in a lower-level device connected to the one terminal device among the lower-level devices;
allocating, for each one terminal device of the terminal devices, a start time point of the uplink communication and an information amount of signals for which transmission of the uplink communication is allowed on a basis of a bandwidth of the uplink communication allocated to the user device that is identified by the acquired user device identifier based on the updated correspondence information.

7. A terminal station device which is connected to an upper-level device on an upper-level side and terminal devices on a lower-level side, the terminal devices being connected to respective lower-level devices accommodating a plurality of user devices, the terminal station device comprising:
a communication circuit that receives scheduling information on the uplink communication of the plurality of user devices from the upper-level device;
an information extraction circuit that extracts a bandwidth of uplink communication allocated to each of the plurality of user devices from the scheduling information received by the communication circuit and acquires a lower-level device identifier and a user device identifier associated with each other from the upper-level device, one of the plurality of user devices indicated by the user device identifier being accommodated by one lower-level device of the lower-level devices indicated by the lower-level device identifier;
a processing circuit that creates correspondence information indicating a correspondence among the upper-level device, the terminal devices, the lower-level devices, and the plurality of user devices and updates, on a basis of the lower-level device identifier and the user device identifier, the correspondence information so that the correspondence information indicates which of the plurality of user devices each of the lower-level devices connects to; and
a bandwidth allocation circuit that acquires, for each one terminal device of the terminal devices, a user device identifier identifying a user device of the plurality of user devices on a basis of the updated correspondence information, the user device being accommodated in a lower-level device connected to the one terminal device among the lower-level devices, and the bandwidth allocation circuit allocating, for each one terminal device of the terminal devices, a start time point of the uplink communication and an information amount of signals for which transmission of the uplink communication is allowed on a basis of a bandwidth of uplink communication allocated to the user device that is identified by the user device identifier acquired by the bandwidth allocation circuit.

* * * * *